US012586055B2

(12) United States Patent
Tsai et al.

(10) Patent No.: US 12,586,055 B2
(45) Date of Patent: Mar. 24, 2026

(54) SYSTEM AND METHOD FOR NEAR FIELD COMMUNICATIONS PAYMENT

(71) Applicant: Stripe, LLC, South San Francisco, CA (US)

(72) Inventors: Hwai Sian Tsai, Hong Kong (HK); Wayne Gan, Hong Kong (HK); Chi Wah Lo, Hong Kong (HK)

(73) Assignee: Stripe, LLC, South San Francisco, CA (US)

( * ) Notice: Subject to any disclaimer, the term of this patent is extended or adjusted under 35 U.S.C. 154(b) by 468 days.

(21) Appl. No.: 17/975,247

(22) Filed: Oct. 27, 2022

(65) Prior Publication Data

US 2023/0140038 A1     May 4, 2023

Related U.S. Application Data

(60) Provisional application No. 63/272,740, filed on Oct. 28, 2021.

(51) Int. Cl.
*G06Q 20/32* (2012.01)
*G06K 7/10* (2006.01)
*G06Q 20/34* (2012.01)

(52) U.S. Cl.
CPC ..... *G06Q 20/3278* (2013.01); *G06K 7/10128* (2013.01); *G06Q 20/341* (2013.01); *G06Q 20/352* (2013.01); *G06Q 20/354* (2013.01)

(58) Field of Classification Search
CPC ............ G06Q 20/3278; G06Q 20/341; G06Q 20/352; G06Q 20/354; G06Q 20/204; G06Q 20/347; G06Q 20/353; G06K 7/10128; G07F 7/0886; G07F 7/0893
See application file for complete search history.

(56) References Cited

U.S. PATENT DOCUMENTS

| | | | |
|---|---|---|---|
| 10,182,328 B1 * | 1/2019 | Maibach ............ | G06Q 20/3278 |
| 10,318,952 B1 * | 6/2019 | Wade ........................ | H04B 5/24 |
| 10,885,514 B1 | 1/2021 | Hart et al. | |
| 2016/0300087 A1 * | 10/2016 | Greig ........................ | H04B 5/77 |

FOREIGN PATENT DOCUMENTS

WO     WO-2018005475 A1 *     1/2018     ........... G07F 7/0893

OTHER PUBLICATIONS

ST25R3916 NFD/RFID reader IC, retrieved from https://www.st.com/en/nfc/st25r3916.html on Oct. 2, 2021.

* cited by examiner

*Primary Examiner* — Charles R Kasenge
(74) *Attorney, Agent, or Firm* — BAKERHOSTETLER

(57) ABSTRACT

A card detection subsystem for control of a payment card reader, where the payment card reader comprises a magnetic stripe reader (MSR), an integrated circuit card (ICC) reader, and a near field communications (NFC) reader, and the NFC reader comprises an antenna. The card detection subsystem includes a processor, a storage, and one or more sensors. The one or more sensors detect a payment card and the antenna is either turned on or turned off based on the detection of the payment card.

20 Claims, 4 Drawing Sheets

SYSTEM AND METHOD FOR NEAR FIELD COMMUNICATIONS PAYMENT

CROSS-REFERENCE TO RELATED APPLICATIONS

This claims benefit of U.S. Provisional Application No. 63/272,740, filed Oct. 28, 2021, entitled SYSTEM AND METHOD FOR NEAR FIELD COMMUNICATIONS PAYMENT This provisional patent application is incorporated by reference herein in its entirety.

TECHNICAL FIELD

The present disclosure relates to near field communications (NFC) techniques for payments.

SUMMARY

In one example embodiment, a card detection subsystem for control of a payment card reader includes a processor. The payment card reader includes a magnetic stripe reader (MSR), an integrated circuit card (ICC) reader, and a near field communications (NFC) reader, and the NFC reader comprises an antenna. The card detection subsystem also includes a storage. The card detection subsystem also includes one or more sensors. The one or more sensors detect a payment card and the antenna is either turned on or turned off based on the detection of the payment card.

In one or more of the above examples, the MSR, the ICC reader, and the antenna are initially turned off and the NFC antenna is turned on based on the detection of the payment card.

In one or more of the above examples, the detection of the payment card comprises a proximity sensing process.

In one or more of the above examples, the one or more sensors comprise a capacitive sensor.

In one or more of the above examples, the detection of the payment card comprises an imaging-based process.

In one or more of the above examples, the imaging-based process comprises capturing one or more images by the one or more sensors and the captured one or more images are processed by the processor to estimate a likelihood of use of the NFC reader.

In one or more of the above examples, the MSR, the ICC reader, and the NFC reader are initially turned on and the NFC reader is turned off based on the estimate of the likelihood of use of the NFC reader by the processor.

In one or more of the above examples, the MSR, the ICC reader, and the NFC reader are initially turned off and the NFC reader is turned on based on the estimate of the likelihood of use of the NFC reader by the processor.

In another example embodiment, a method of reducing interference with a magnetic stripe reader (MSR) in a payment card reader includes detecting, by one or more sensors, a payment card. The payment card reader includes an integrated circuit card (ICC) reader and a near field communications (NFC) reader, and the NFC reader includes an antenna. The method also includes either turning on or turning off an NFC antenna based on the detecting of the payment card.

In one or more of the above examples, the MSR, ICC reader, and the antenna are initially turned off and the antenna is turned on based on the detecting of the payment card.

In one or more of the above examples, the detecting of the payment card comprises a proximity sensing process.

In one or more of the above examples, the proximity sensing process is performed using a capacitive sensor.

In one or more of the above examples, the detecting of the payment card comprises an imaging-based process.

In one or more of the above examples, the imaging-based process comprises capturing one or more images by the one or more sensors, and the method also includes processing the one or more captured images and estimating a likelihood of use of the NFC reader based on the processing of the one or more captured images.

In one or more of the above examples, the MSR, the ICC reader, and the NFC reader are initially turned on and the NFC reader is turned off based on the estimating of the likelihood of use of the NFC reader.

In one or more of the above examples, the MSR, the ICC reader, and the NFC reader are initially turned off and the NFC reader is turned on based on the estimating of the likelihood of use of the NFC reader.

In another example embodiment, a method of reducing accidental reading of a payment card in a payment card reader includes detecting, by one or more sensors, the payment card. The payment card reader includes an integrated circuit card (ICC) reader and a near field communications (NFC) reader, and the NFC reader includes an antenna. The method also includes either turning on or turning off the antenna based on estimating a likelihood of use of the NFC reader.

In one or more of the above examples, the NFC reader is initially either turned off or operating in a quiescent mode and the NFC reader is turned on based on the estimating of the likelihood of use of the NFC reader.

In one or more of the above examples, the NFC reader is initially turned off when one or more dimensions of the payment card reader is below one or more thresholds.

In one or more of the above examples, a power level in the quiescent mode is set based on one or more dimensions of the payment card reader.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding, reference is now made to the following description taken in conjunction with the accompanying Drawings in which.

DETAILED DESCRIPTION

Figure 1:
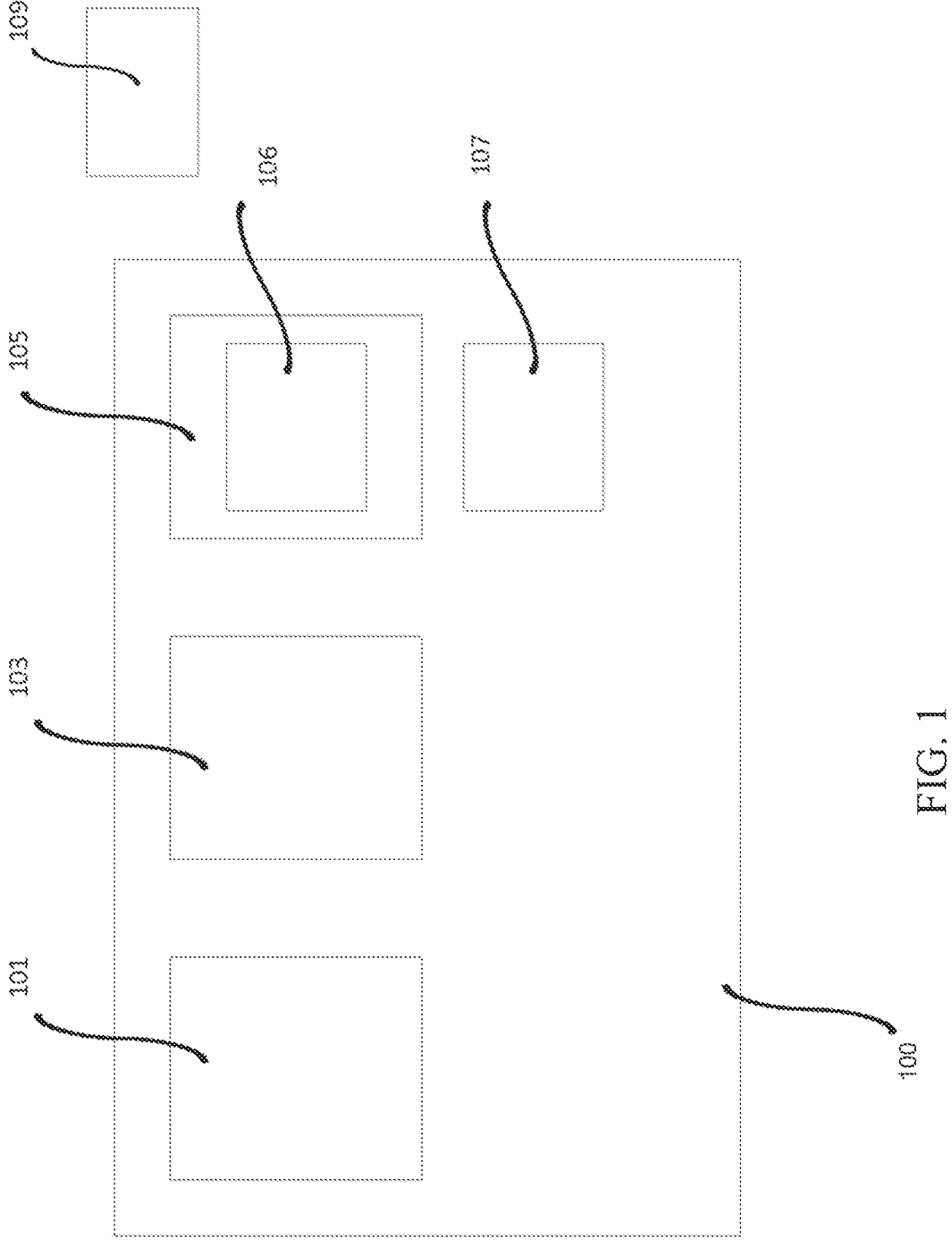
FIG. 1 illustrates an exemplary embodiment of a payment card reader in accordance with this disclosure.

Referring now to the drawings, wherein like reference numbers are used herein to designate like elements throughout, the various views and embodiments of system and method for near field communications payment are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

A Mobile Point of Sale (MPOS) device is a more mobile version of a traditional Electronics Fund Transfer Point of Sale (EFTPOS) device. An MPOS device is typically used together with a mobile device such as a mobile phone or tablet, and the MPOS device is typically used to read cards and PIN entry, while functions such as communication and more complicated user interfaces are shifted to the mobile device. This has led to a lower cost and more mobile solution for accepting PINs. Many MPOS devices are equipped with three (3) payment card interfaces: a Magnetic stripe reader (MSR), an integrated circuit card (ICC) or "chip card" reader, and a near field communications (NFC) reader.

To improve portability, the size of a typical MPOS device continues to decrease. This means that the physical distances between the MSR, ICC reader and NFC reader continues to decrease. For example, there are MPOS devices which have a width of 65 mm (2.56 inches), a length of 60 mm (2.36 inches) and a height or thickness of 20 mm (0.79 inches).

The NFC reader reads a contactless payment card based on the interaction between the emitted magnetic field from the reader and the payment card. The emitted magnetic field strength is strictly determined by the EMV (Europay, Mastercard and Visa) contactless level 1 certification requirements. These certification requirements are updated from time to time, and each update always requires a higher magnetic field strength to accommodate the new payment cards.

In a typical usage scenario, all three payment card interfaces are turned on all the time, and the user selects one interface, that is, one of the MSR, ICC reader and NFC reader.

Many users prefer inserting the card into the ICC or swiping the card through the MSR interfaces over tapping the card on the NFC reader interface, as they need to submit authentication in the form of a signature or a personal identification number (PIN) before payment is accepted. However, as the dimensions of an MPOS device continue to reduce and the emitted magnetic field strength continues to increase, the probability of the NFC sensing zone covering either the MSR interface or the ICC interface increases. Then, when the user goes to insert or swipe the payment card, the NFC reader detects the NFC chip on the card as though the user was tapping the card, and completes the transaction. This accidental reading problem leads to reduced user satisfaction and user experience, and some users may not even accept this.

Furthermore, the NFC reader emitted magnetic field strength may still be strong enough that the functioning of the MSR degrades as the NFC reader dimensions are reduced. Then, the MSR cannot read cards properly.

Some solutions have been proposed to solve the above issues, but these solutions suffer from limitations. For example, a ferrite sheet to shield the emitted magnetic field at the NFC card reader antenna can be added. However, as the EMV contactless level 1 certification requirements get stricter and more test cases are added, adding a ferrite sheet may lead to devices failing to meet a certification requirement. This is especially true for MPOS devices with small antennae. Furthermore, depending on the NFC transceiver integrated circuits (IC) driving capability and the antenna shape, it may not be possible to add a ferrite sheet.

Another possible solution is adding a mechanical card detection switch at the ICC reader insertion slot and MSR swipe slot to switch off the NFC magnetic field. However, this requires finding mechanical space to install these two switches. Mechanical reliability of such switches also needs to be considered carefully, because there is a minimum number of insertions and swipes required for a reader. In addition, the NFC magnetic field can only be switched when the payment card physically touches the mechanical switch, which does not help if, for example, the user moves the card proximate to the NFC reader before inserting into the ICC reader insertion slot, or swiping the card through the MSR swipe slot.

Finally, some NFC transceiver ICs have a special card detection mode based on induction methods. These methods comprise either reducing the emitted field turn on time, or detecting the phase or magnitude change when the payment card approaches the device. However, there magnetic fields are still emitted before the card is detected. As MPOS devices get smaller and smaller, there is still a significant chance of the NFC payment card being detected first. Also, the robustness of this solution is not high enough, and this requires very sophisticated tuning and testing.

There is a then a need for solutions to the above-described problems, which do not suffer from the limitations of the previously proposed solutions. Systems and methods for NFC payment cards to solve these problems are described below.

FIG. 1 illustrates an exemplary embodiment of a payment card reader 100 in accordance with this disclosure. The payment card reader 100 can be an MPOS device. The payment card reader 100 reads, for example, payment card 109. The payment card reader 100 includes, for example, MSR 101, ICC reader 103 and NFC reader 105, which has NFC antenna 106. In some embodiments, payment card reader 100 comprises at least a portion of a card detection subsystem 107.

Figure 2:
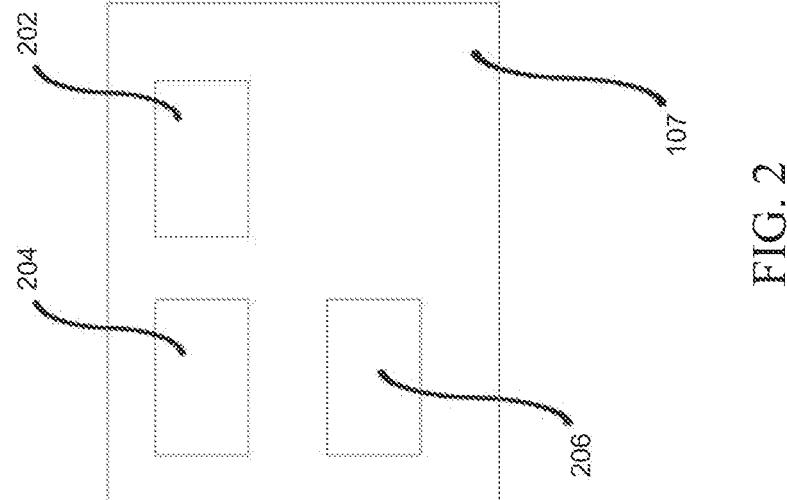
FIG. 2 illustrates an exemplary embodiment of a card detection subsystem in accordance with this disclosure.

FIG. 2 illustrates an exemplary embodiment of the card detection subsystem 107 in accordance with this disclosure. In some embodiments, the card detection subsystem 107 comprises a processor 202, storage 204 and one or more sensors 206. The one or more sensors 206 comprise, for example, proximity sensors such as capacitive sensors, image sensors, infrared sensors and dot projection sensors. Then, based on the data captured by the one or more sensors 206, the NFC antenna 106 is either turned on or off. In some embodiments, at least one of the one or more sensors 206 are external to payment card reader 100.

Figure 3:
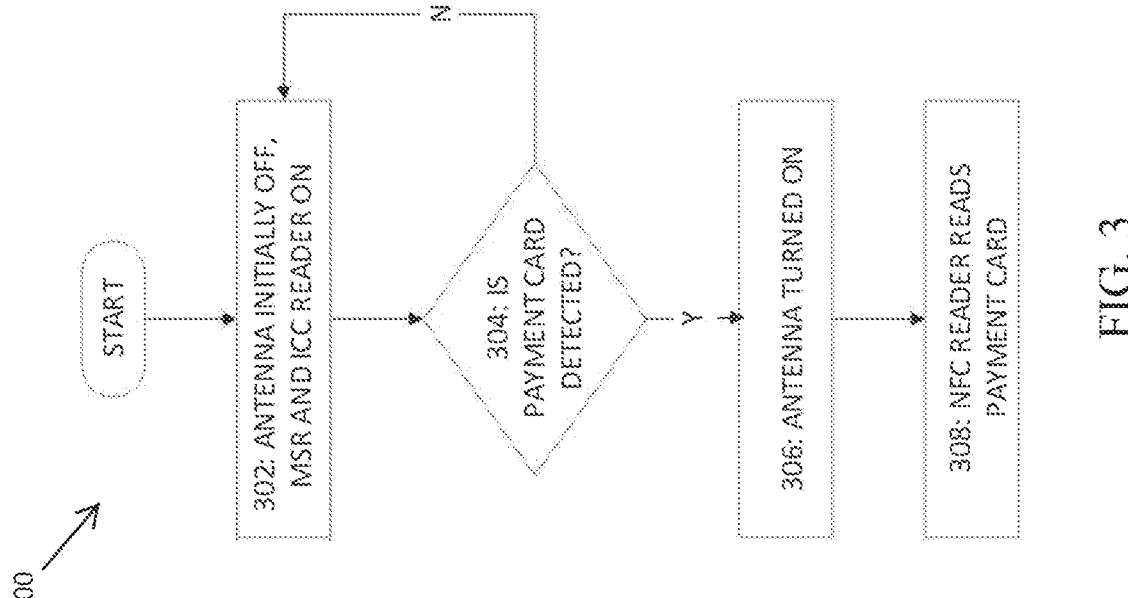
FIG. 3 illustrates an example process to turn on a near field communications (NFC) antenna in accordance with this disclosure.

The card detection subsystem 107 operates to detect a payment card, and based on the detection, the NFC antenna 106 is either turned on or turned off. FIG. 3 illustrates an example process 300 to turn on an NFC antenna in accordance with this disclosure. The process 300 is described with reference to FIGS. 1 and 2. In step 302, the antenna 106 is either in quiescent or low power mode; or initially turned off. Operating the antenna in a quiescent mode has the advantage of reducing the antenna turn on time. The power level in this quiescent mode is set to ensure that the emitted magnetic field is weak enough to reduce the probability of accidental reads or interference with the operation of the MSR. In some embodiments, the power level in the quiescent mode is set based on the dimensions of payment card reader 100. Then, the smaller the payment card reader is, the lower this power level is. In other embodiments, this power level is determined via at least one of simulation and testing. While operating in a low power mode has the advantage of reducing antenna turn on time, there are situations where the antenna is completely switched off initially. For example, when the dimensions of the payment card reader 100 are below one or more thresholds, then in step 302 the antenna is completely switched off initially.

In step 304, one or more sensors 206 in the card detection subsystem 107 act to detect the presence of a payment card such as card 109. Based on this detection, a determination is made whether to turn on the NFC antenna 106. This determination is made by, for example, processor 202.

In some embodiments, the detection in step 304 comprises performing a proximity sensing process. In some embodiments, the proximity sensing process comprises a capacitive sensing process. Then, one or more sensors 206 comprises a capacitive sensor. When the capacitive sensor detects the presence of a card such as card 109 proximate to the NFC reader 105, a determination is made to turn antenna 106 on.

The use of a capacitive sensor has some advantages. The operation of a capacitive sensor is based on a capacitance change when a payment card such as card 109 or a user's hand holding card 109 is proximate to the capacitive sensor. Therefore, the capacitive sensor operates relatively independently of the operation of the NFC antenna 106. In some embodiments, the sensitivity of the capacitive sensor is adjusted independently of the operation of the NFC antenna. In some embodiments, the sensitivity is adjusted to ensure that the NFC antenna turns on only when the card is proximate to the NFC reader, and not when the card is proximate to either the MSR or ICC readers. Furthermore, capacitive sensor technology is robust and already used in many commercial products for distance sensing even under extreme environments. Since there is no mechanical switch installed at either the ICC reader slot or the MSR slot, the mechanical reliability can be maintained. Finally, if the above conditions are met, then the NFC magnetic field can be turned on to the full strength needed to satisfy the EMV contactless L1 certification requirements, and there is no need to adjust any field strength, phase, or magnitude in contradiction of the certification requirements.

An example of a capacitive sensor used in the context of an NFC reader is provided in https://www.st.com/en/nfc/st25r3916.html, retrieved Oct. 5, 2021, and which is incorporated by reference herein in its entirety.

In other embodiments, the detection in step 304 comprises the card detection subsystem performing an imaging-based process to make the determination. The imaging-based process comprises image capture and processing to detect the presence of the card. Based on data captured by the one or more sensors 206, a position and trajectory of a card 109 is estimated by, for example processor 202. For example, when sensors 206 comprise image sensors, the data comprises captured images of the card 109. These captured images are processed by processor 202. Based on the processing, a position and a trajectory of a card 109 is estimated by, for example, processor 202. Techniques to process images to estimate position and trajectory of a card are, for example, disclosed in U.S. Pat. No. 10,885,514, filed on Jul. 15, 2019 and issued on Jan. 5, 2021 to Hart et al, which is incorporated by reference herein in its entirety. Processor 202 then implements one or more of the image processing algorithms and artificial intelligence or machine learning algorithms, such as explained in U.S. Pat. No. 10,885,514, to perform the image processing. In some embodiments, the captured images and algorithms are stored in storage 204. The captured images are then processed by processor 202 using the algorithms stored in storage 204. Then, based on the estimated position and trajectory of the card, the antenna 106 is switched on when the estimated position and trajectory of the card indicates that there is a high likelihood that the user is about to use the NFC reader 105. In other embodiments, such as explained in U.S. Pat. No. 10,885,514, the image sensors are triggered to begin capturing images based on detection of a card by proximity sensors.

Returning to FIG. 3, in step 306 antenna 106 is turned on based on the determination made. For example, processor 202 sends one or more signals to NFC reader 105 or payment card reader 100 to turn on antenna 106. When the antenna is turned on, a magnetic field is emitted in step 306. The NFC reader 105 then reads card 109 in step 308.

Although FIG. 3 illustrates one example of a process 300 to turn on an NFC antenna, various changes may be made to FIG. 3. For example, while shown as a series of steps, various steps in FIG. 3 could overlap, occur in parallel, occur in a different order, or occur any number of times.

Figure 4:
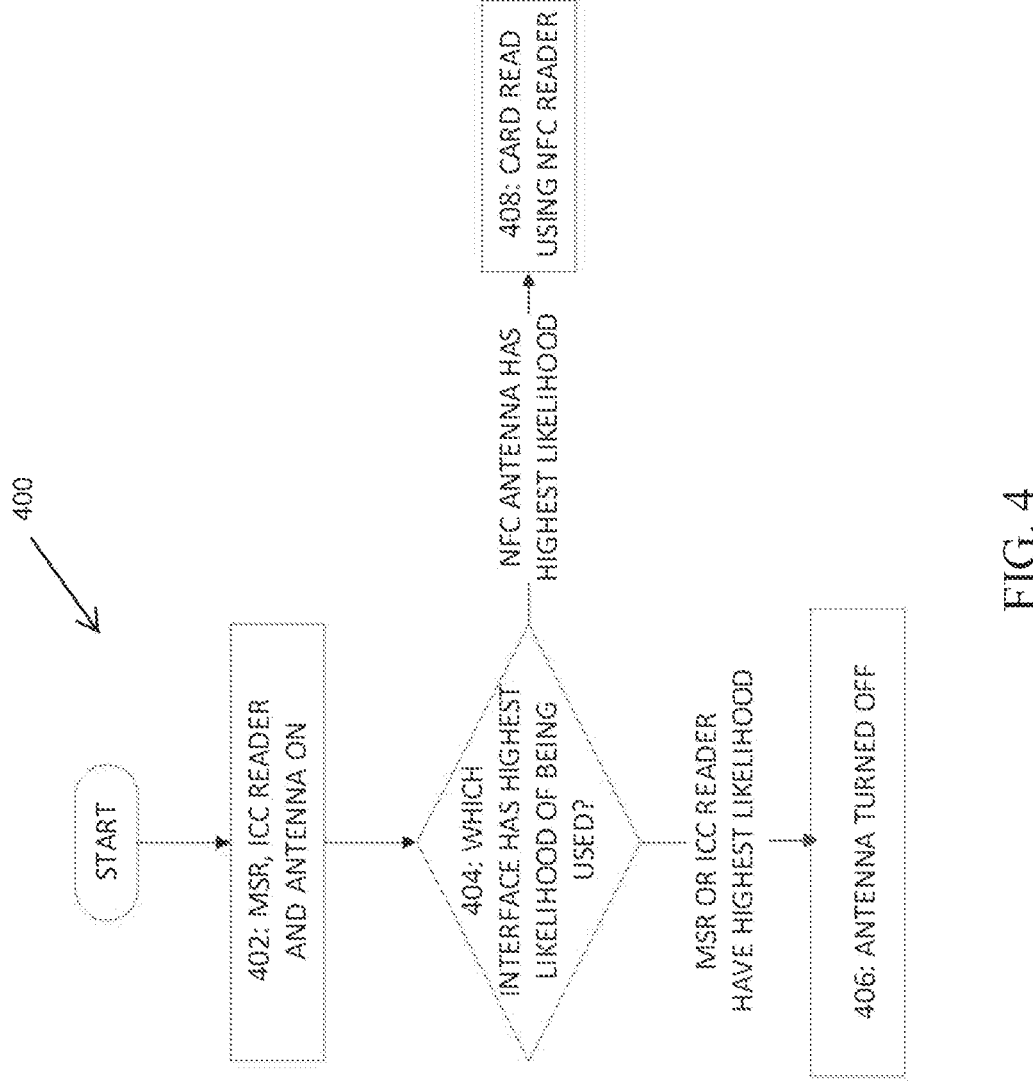
FIG. 4 illustrates an example process to turn off a near field communications (NFC) antenna in accordance with this disclosure.

In some alternative embodiments, the MSR 101, ICC reader 103 and antenna 106 are initially switched on. Then, when it is determined that either the ICC reader 103 or the MSR 101 have the highest likelihood of being used, the NFC antenna 106 is switched off. FIG. 4 illustrates an example process 400 to turn off a near field communications (NFC) antenna in accordance with this disclosure. In step 402, the MSR 101, the ICC reader 103 and the antenna 106 are initially switched on.

In step 404, based on a detection of the card, a determination is made about which interface has the highest likelihood of being used. The detection is performed using, for example one or more sensors 206 of the card detection subsystem 107 of FIG. 2. The determination in is made using, for example, the processor 202 of the card detection subsystem 107 of FIG. 2. As explained above, in some embodiments, the sensors 206 comprise image sensors which capture images of a card such as the card 109. Then, a trajectory and position of the card 109 is estimated by the processor 202 using, for example, one or more image processing algorithms, machine learning and artificial intelligence algorithms, such as explained in U.S. Pat. No. 10,885,514. Based on the estimated trajectory and position, the likelihood of each interface being used is then determined by processor 301. In some embodiments, the captured images and algorithms are stored in the storage 204. The captured images are then processed by processor 301 using the algorithms stored in the storage 204.

When either the ICC reader 103 or the MSR 101 are determined to have the highest likelihood of being used, the NFC antenna 106 is switched off in step 406. The switching off is performed based on, for example, processor 301 sending one or more signals to NFC reader 105 to turn off antenna 106. Otherwise, in step 408, the NFC antenna 106 remains on and the card is read using NFC reader 105.

As explained above, in some embodiments, payment card reader 100 comprises at least a portion of a card detection subsystem 107. For example, in these embodiments, payment card reader 100 comprises one or more of processor 301, storage 204 or one or more sensors 206. In other embodiments, card detection subsystem 107 is external to payment card reader 100.

Although FIG. 4 illustrates one example of a process 400 to turn off an NFC antenna, various changes may be made to FIG. 4. For example, while shown as a series of steps, various steps in FIG. 4 could overlap, occur in parallel, occur in a different order, or occur any number of times.

It will be appreciated by those skilled in the art having the benefit of this disclosure that this system and method for near field communications payment provides a way to reduce accidental reading of payment cards and interference with the operation of the MSR on an MPOS device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A card detection subsystem for control of a payment card reader, wherein the payment card reader comprises a near field communications (NFC) reader, a magnetic stripe reader (MSR), and an integrated circuit card (ICC) reader, and the NFC reader comprises an antenna, the card detection subsystem comprising:
   a storage;
   one or more sensors to detect a payment card; and
   a processor to:
      estimate a likelihood of use of the NFC reader, the MSR, and the ICC reader based on the detection of the payment card,
      determine whether the NFC reader, the MSR, or the ICC reader has a highest likelihood of being used based on the estimate of the likelihood of use of the NFC reader, the MSR, and the ICC reader, and
      in response to determining that the MSR or the ICC reader has the highest likelihood of being used, turn off the antenna of the NFC reader;
   wherein:
   the MSR, the ICC reader, and the antenna of the NFC reader are initially turned on; and
   the antenna of the NFC reader is either turned on or turned off based on the estimate of the likelihood of use of the NFC reader, the MSR, and the ICC reader.

2. The card detection subsystem of claim 1, wherein the antenna is turned off or operating in a quiescent mode.

3. The card detection subsystem of claim 1, wherein the detection of the payment card comprises a proximity sensing process.

4. The card detection subsystem of claim 3, wherein the one or more sensors comprise a capacitive sensor.

5. The card detection subsystem of claim 1, wherein the detection of the payment card comprises an imaging-based process.

6. The card detection subsystem of claim 5, wherein:

the imaging-based process comprises capturing one or more images by the one or more sensors; and the captured one or more images are processed by the processor to estimate the likelihood of use of the NFC reader.

7. The card detection subsystem of claim 1, wherein:

the processor is further to: in response to determining that the NFC reader has the highest likelihood of being used, keep the antenna of the NFC reader on or turn on the antenna of the NFC reader.

8. The card detection subsystem of claim 6, wherein:

the antenna is turned on based on the estimate of the likelihood of use of the NFC reader, the MSR, and the ICC reader by the processor.

9. A method of control of a payment card reader, wherein the payment card reader comprises a near field communications (NFC) reader, a magnetic stripe reader (MSR), and an integrated circuit card (ICC) reader, and the NFC reader comprises an antenna, the method comprising:

detecting, by one or more sensors, a payment card;

estimating a likelihood of use of the NFC reader, the MSR, and the ICC reader based on the detection of the payment card;

determining whether the NFC reader, the MSR, or the ICC reader has a highest likelihood of being used based on the estimating of the likelihood of use of the NFC reader, the MSR, and the ICC reader; and in response to determining that the MSR or the ICC reader has the highest likelihood of being used, turning off the antenna of the NFC reader;

wherein the MSR, the ICC reader, and the antenna of the NFC reader are initially turned on.

10. The method of claim 9, wherein the antenna is turned off or operating in a quiescent mode.

11. The method of claim 9, wherein the detecting of the payment card comprises a proximity sensing process.

12. The method of claim 11, wherein the proximity sensing process is performed using a capacitive sensor.

13. The method of claim 9, wherein the detecting of the payment card comprises an imaging-based process.

14. The method of claim 13, wherein the imaging-based process comprises capturing one or more images by the one or more sensors;

the method further comprises processing the one or more captured images; and estimating the likelihood of use of the NFC reader comprises estimating the likelihood of use of the NFC reader based on the processing of the one or more captured images.

15. The method of claim 9, further comprising:

in response to determining that the NFC reader has the highest likelihood of being used, keeping the antenna of the NFC reader on or turning on the antenna of the NFC reader.

16. The method of claim 14, wherein:

the antenna is turned on based on the estimating of the likelihood of use of the NFC reader, the MSR, and the ICC reader.

17. A method of reducing accidental reading of a payment card in a payment card reader comprising a near field communications (NFC) reader, a magnetic stripe reader (MSR), and an integrated circuit card (ICC) reader, wherein the NFC reader comprises an antenna, the method comprising:

detecting, by one or more sensors, the payment card;

estimating a likelihood of use of the NFC reader, the MSR, and the ICC reader based on the detection of the payment card;

determining whether the NFC reader, the MSR, or the ICC reader has a highest likelihood of being used based on the estimating of the likelihood of use of the NFC reader, the MSR, and the ICC reader; and in response to determining that the MSR or the ICC reader has the highest likelihood of being used, turning off the antenna of the NFC reader;

wherein the MSR, the ICC reader, and the antenna of the NFC reader are initially turned on.

18. The method of claim 17, wherein:

the antenna is turned off or operating in a quiescent mode.

19. The method of claim 18, wherein the antenna is turned off when one or more dimensions of the payment card reader is below one or more thresholds.

20. The method of claim 18, wherein a power level in the quiescent mode is set based on one or more dimensions of the payment card reader.

* * * * *